Aug. 11, 1942.          E. A. MAHANNAH          2,292,577
                       WEAR TESTING MACHINE
                    Filed June 14, 1940      2 Sheets-Sheet 1
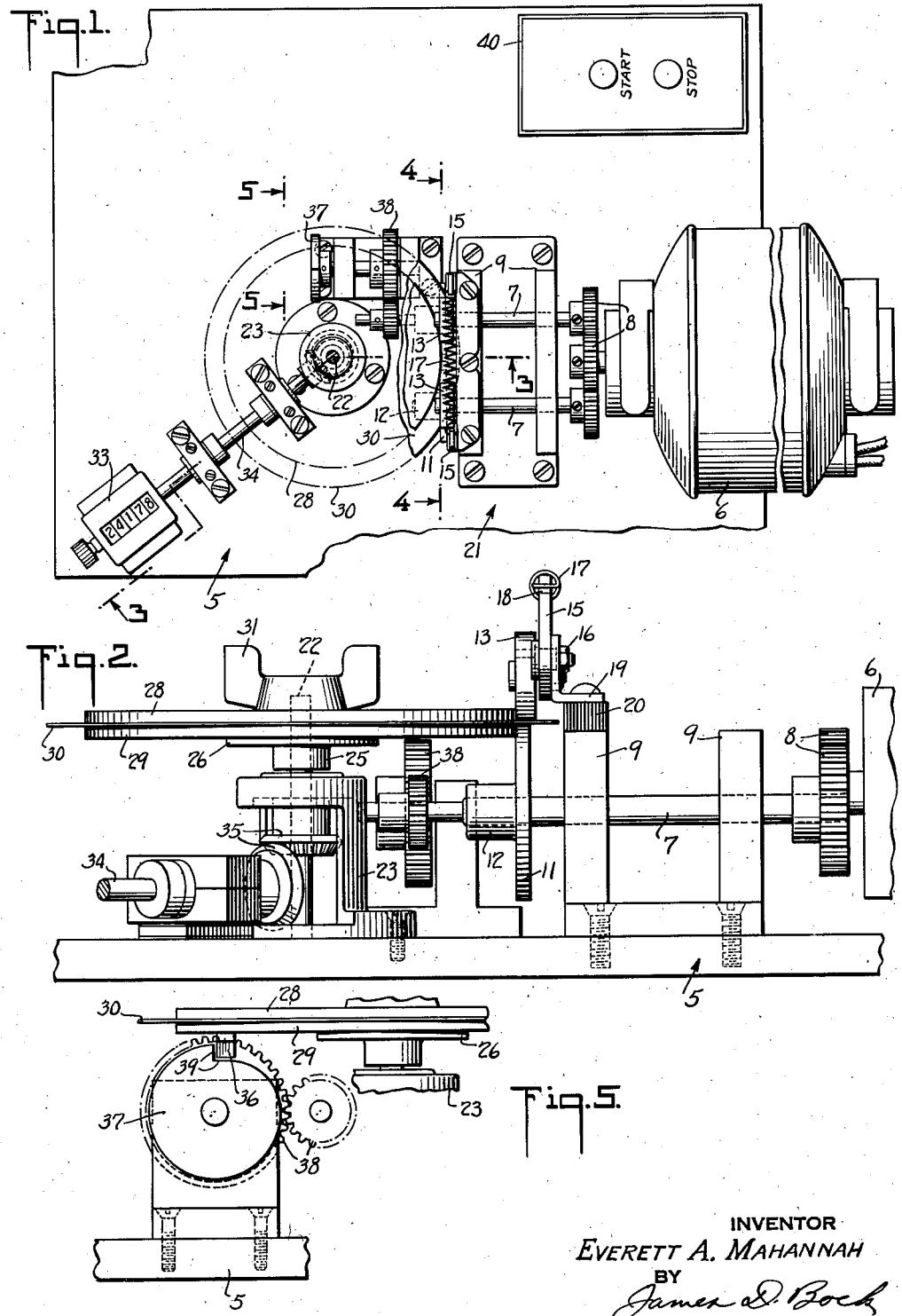
INVENTOR
EVERETT A. MAHANNAH
BY
James D. Bock
ATTORNEY Aug. 11, 1942.  E. A. MAHANNAH  2,292,577
WEAR TESTING MACHINE
Filed June 14, 1940  2 Sheets-Sheet 2
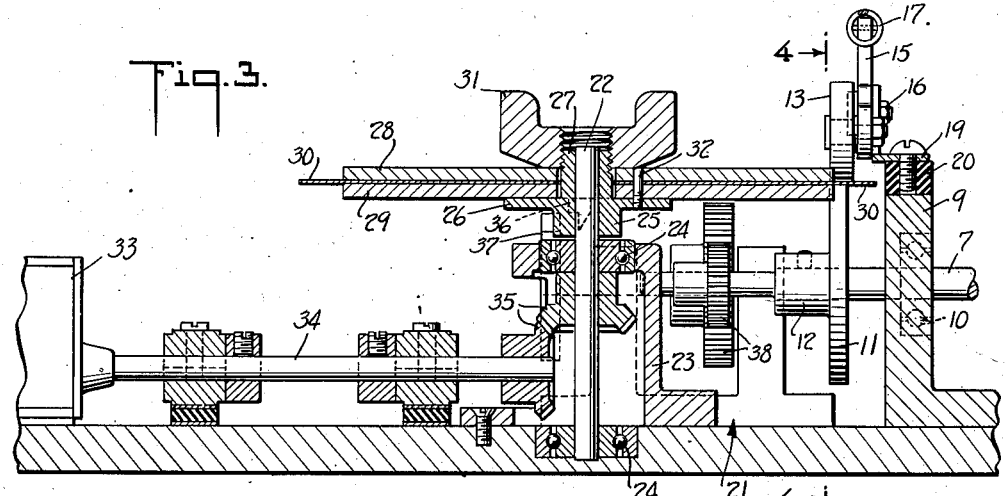
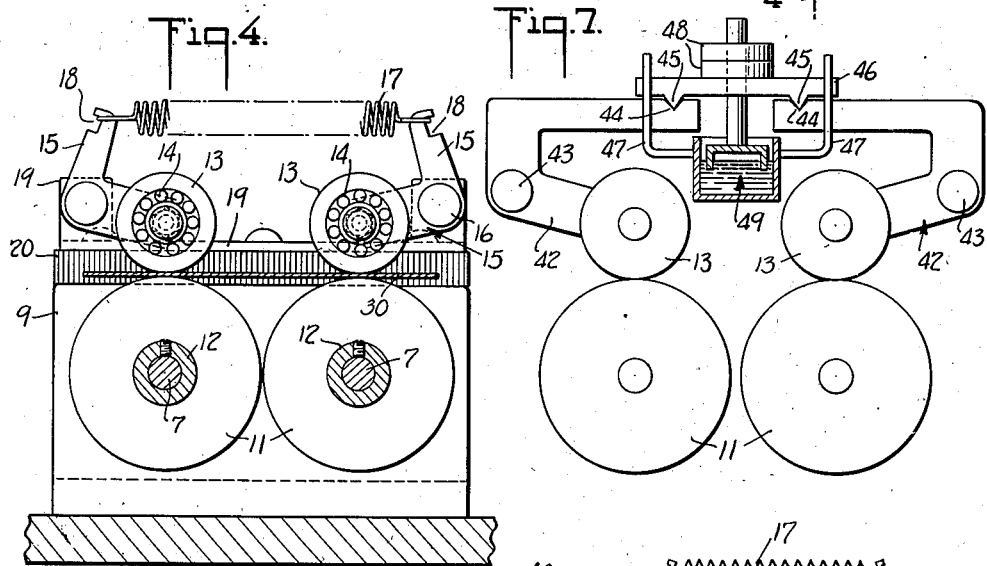
INVENTOR
EVERETT A. MAHANNAH
BY
James D. Bock
ATTORNEY Patented Aug. 11, 1942

2,292,577

UNITED STATES PATENT OFFICE 2,292,577

WEAR TESTING MACHINE

Everett A. Mahannah, Niagara Falls, N. Y., assignor to International Paper Company, New York, N. Y., a corporation of New York Application June 14, 1940, Serial No. 340,440

11 Claims. (Cl. 73—51)

This invention relates to new and useful improvements in testing equipment generally, and particularly seeks to provide a device by which the wear and tear characteristics of cards suitable for use in tabulating and sorting machines can be determined.

In the manufacture of grades of paper suitable for the formation of cards for use in conjunction with the tabulating and sorting machines, it has been found difficult to determine in advance of actual use what physical characteristics are necessary in the paper in order that the paper may withstand the wear effects of a sorting machine or the like over a substantially great period of time. Heretofore it has been the practice to order a supply of paper from which these cards are to be formed, shipping the paper ordered to the company using the cards and then testing the cards by actual operation in a sorting machine or the like. If the actual operation of the machine with the cards used therein indicated that the physical characteristics of the paper were such that the paper could not withstand the wearing effects of the machine, it became necessary to return the paper to the paper manufacturer who, in turn, was forced to run off another batch.

This invention seeks to avoid such delays resultant from the procedure as heretofore used, and also seeks to provide testing apparatus through the use of which a paper manufacturer can adequately test a trial run of paper under conditions closely simulating actual operation of a sorting or tabulating machine or the like.

Therefore, the principal object of the invention is to provide a testing device by which wearing characteristics of paper from which record cards are to be formed can be determined.

Another object of the invention is to provide a device of the character stated by which wearing characteristics of record card paper can be easily determined under testing conditions closely approaching the actual operating conditions of a card sorting, tabulating machine, or the like.

Another object of the invention is to provide a device of the character stated in which the sample to be tested is displaced in feed simulating movement by engagement between pairs of sample feed wheels having diameters closely approximating the diameters of feed rollers in the actual sorting machines or the like.

Another object of the invention is to provide a device of the character stated in which motion of the sample being tested is stopped at properly timed intervals to thereby effect relative slipping between the sample and the feed rolls at substantially the same place on the sample at each stop whereby wearing of the sample will be accelerated and time of testing will be reduced and whereby actual operating conditions will be more closely reproduced.

Another object of the invention is to provide a device of the character stated which includes a sheet support, and one or more pairs of power-driven wheels disposed adjacent said sheet support with the plane of contact between said wheels and the general plane of said sheet support being substantially coplanar.

Another object of the invention is to provide a device of the character stated in which the sheet support thereof comprises a pair of horizontally disposed sheet clamping plates releasably secured to a rotatable vertical spindle and means connected with said spindle for counting the revolutions thereof.

Another object of the invention is to provide a device of the character stated in which each pair of wheels includes a driven wheel and idle wheel, the idle wheel being spring biased against the driven wheel.

Another object of the invention is to provide a device of the character stated in which the idle wheel support is insulated from the driven wheel support and in which automatic stop means is electrically actuated by passage of the current between the idle wheels and the driven wheels upon tearing of a sheet of paper which had been retained therebetween.

Another object of the invention is to provide a device of the character stated which is simple in design, rugged in construction and economical to manufacture.

With these and other objects in view, the nature of which will become more apparent, the invention will be more fully understood by reference to the drawings, the accompanying detailed description, and the appended claims.

In the drawings:

Fig. 1 is a top plan view of a paper testing device constructed in accordance with this invention, the sheet supporting discs being removed from the spindle in order to more clearly disclose certain details of mechanism thereunder;

Fig. 2 is a front elevation thereof;

Fig. 3 is a vertical section taken along line 3—3 of Fig. 1;

Fig. 4 is a detail end elevation of the wheel assembly;

Fig. 5 is a detail end elevation of the cam stop and drive therefor;

Fig. 6 is a wiring diagram for the automatic stop; and

Fig. 7 is a detail end elevation of alternate means for loading the idler wheels.

Referring to the drawings in detail the invention as illustrated is embodied in a testing machine for determining the wear quality of paper manufactured for use as record cards or the like, and which includes a base 5 having a motor 6 mounted thereon and adapted to drive a pair of spaced parallel shafts 7 through the medium of gear connections generally indicated at 8. The shafts 7 are journalled in spaced standards 9 secured to the base and which may be provided with antifriction bearings 10. The ends of the respective shafts 7 project beyond the standards and are provided with feed wheels 11 secured thereto through the medium of hubs 12.

A pair of idler feed wheels 13 which are disposed in vertical alignment and in contact with the wheels 11 are carried by anti-friction bearings 14 secured to opposing arms of bell cranks 15 pivotally mounted as at 16. The other arms 15 of the bell cranks are spring biased towards each other by a spring 17, the ends of which are engageable in notches 18 formed in the upstanding arms of the bell cranks to thereby effect application of pressure to the idler wheels against the peripheral edges of the driven wheels 11. The bell cranks may be secured to brackets 19 fastened to one of the standards 9 and insulated therefrom by an insulating block 20.

The testing machine includes a sheet supporting means generally indicated at 21 and having a spindle 22 journalled in a standard 23 through the medium of anti-friction bearings 24. The upper end of the spindle projects beyond the standard 23 and is provided with a support member 25 having a flanged portion 26 and an upstanding threaded portion 27 formed integral therewith. A pair of metallic test sample supporting or clamping discs 28, 29 are supported on the flange 26 and are maintained in centered position by the threaded portion 27 of the support. It should be noted that the plane of the abutting surfaces of the discs 28, 29 is disposed in substantially coplanar relation with the general plane of contact between the respective sets of driven and idler wheels 11 and 13. A test sample 30 of paper is adapted to be disposed between the discs 28, 29 which are maintained in paper clamping relation by a wing nut 31 threadably engaged on the upstanding member 27 of the support member. In order to prevent relative movement between the plates 28, 29 and the flange 26, the flange is provided with an upstanding stud 32 engageable in suitable apertures formed in the discs. The revolutions of the spindle 22 and the associated test sample 30 under the influence of the driving wheels 11, 13 are counted by appropriate counting mechanism generally indicated at 33 and having a counter shaft 34 driven from the spindle through the medium of bevelled gears 35.

In order to simulate the actual operating conditions under which record cards are placed, it is necessary to provide stop and go movement to the spindle. This is effected through the medium of a depending lug 36 secured to the disc 29 and engageable with a cam detent device 37 mounted on the base and positively driven in timed relation to the wheels 11, 13 through the medium of gear connections 38 connecting the detent with one of the driven shafts 7. The detent is so timed that it will effect a momentary stop of the spindle 22 once each revolution thereof. It should be noted that the axis of the detent shaft is tangential to the path of travel of the lug 36 so that the lug 36 will abut one face of the detent until it registers with a step portion 39 formed in the detent and is again permitted to resume movement.

In Fig. 6 of the drawings there is illustrated a wiring diagram which may be used when an automatic stop is employed to stop operation of the tester when a test or sample sheet breaks. It will be seen that the driven and idler wheels 11, 13 are connected in parallel with the stop button of a control switch 40 which is in turn connected to the motor 6 through the usual control relay generally indicated at 41 and which is provided with the usual relay contacts 41', 41'. During actual testing of a sample the circuit through the wheels 11, 13 is open since the test sample is interposed therebetween. Upon breaking of the sample, the circuit is closed through the wheels 11, 13 thereby causing the control relay contacts to open and stop the motor. The comparative quality of the test sample may be determined by reading the revolutions indicated by the counter 33 at the time of stopping and then comparing that reading with a predetermined established standard. Pushing the start button of the switch 40 allows current to flow through the resistance and the control coil of the relay in the well known manner to again place the testing device in operation.

In Fig. 7 of the drawings there is disclosed another way in which pressure may be applied to the idler wheels 13. In this instance the idler wheels are carried by generally U-shaped arms 42 pivotally mounted at 43 and the other ends of which are provided with V-shaped notches 44 engageable with knife edges 45 of a load or pressure applying beam 46. The beam 46 is freely supported in guideways 47 carried by the standards 9 and carries pressure weights 48 thereon. A fluid medium dash pot, generally indicated at 49, may be supported by the standards 9 and may be connected with the beam 46 to smooth out the action thereof if desirable.

In using the testing machine described herein the disc 30 of sample paper is cut in any desired manner and should be of such diameter that when mounted between the plates 28, 29 the edge portions thereof will extend between and be engaged by the respective wheel sets 11, 13. Upon pressing the start button of the switch 40, the motor 6 will be set into operation in the well known manner and will drive the wheels 11 through the gear connections 8 in the manner described, and by virtue of the frictional engagement of the sample sheet 30 with the respective wheels 11, 13 the sample sheet will be rotated under the influence of said wheels. Thus it will be readily apparent that rotation of the sample sheet 30 will effect a rotation of the spindle 22 and an actuation of the counter mechanism 33. As the spindle is being rotated the lug 36 mounted on the lower disc 29 will abut against one face of the cam detent 37 thus bringing the spindle to a stop and causing a sliding movement of the wheels 11 relative to the test sheet 30. Since the detent 37 is driven in timed relation to the wheels 11 the stepped portion 39 of the detent will be brought into registry with the lug 36 to thereby permit the lug to resume its motion and consequently permit the test sheet and the spindle to resume rotation. In this manner the testing of a paper sample very closely simulates the actual stop and go operating conditions encountered in a card sorting tabulating machine, or the like.

It should be observed that, in connection with the stop and go motion of the spindle, sliding contact between the feed wheels and the sample during the time the motion of the spindle is stopped will always occur at substantially the same place on the sample. Thus the actual time of testing any given sample to the point of failure is materially decreased. Should it be found desirable to stop the spindle more than once during each revolution, additional lugs 36 may be affixed to the disk 29. It is of course entirely possible to so time the actuation of the cam detent that the spindle rotates through more than one revolution before being stopped. It is of course apparent that, if the stopping of the spindle should be so timed, the actual time required to produce failure in any given test sample of paper will be somewhat increased, since a greater than normal number of rotations of the spindle will be necessary in order to produce a sufficiently high number of sliding contacts between the sample and feed wheels at any one spot to effect a wearing through of the paper.

In order more closely to approach actual operating conditions, it is desirable that the diameter of the driven wheels 11 be comparable to the diameter of such feed wheels as may be present in the actual sorting machines or the like; and it is also desirable that the linear speed of travel of the periphery of the wheels 11 be substantially equivalent to the linear speed of travel of the feed wheels in said sorting wheels. For instance, if an actual sorting machine employed feed wheels having a linear speed of peripheral travel of approximately 450 feet per minute then the driven wheels 11 of this testing machine should be rotated at a sufficiently high number of revolutions per minute to provide the linear peripheral speed of 450 feet per minute.

Thus it will be seen that the herein disclosed invention provides novel testing apparatus for determining the wear quality of paper manufactured for use as record cards and which operates under conditions simulating actual operation of card sorting machines or the like and which is simple in design and rugged in construction.

It is of course to be understood that the details of arrangement and proportion of parts may be modified without exceeding the scope of the appended claims.

I claim:

1. In a device for testing wear quality of paper samples, a freely rotatable support for holding a sample of paper to be tested, feed wheels engageable with the opposite faces of said sample and effective to rotate said sample and said support as the result of feeding action, means for driving at least one of said feed wheels, and means for stopping the rotation of said support at regularly timed intervals to thereby momentarily cause slip between the sample and said feed wheels.

2. In a device for testing wear quality of paper samples, a freely rotatable support for holding a sample of paper to be tested, feed wheels engageable with the opposite faces of said sample and effective to rotate said sample and said support as the result of feeding action, means for driving at least one of said feed wheels, means for stopping the rotation of said support at regularly timed intervals to thereby momentarily cause slip between the sample and said feed wheels, and means associated with said sample support for counting the revolutions thereof.

3. In a device for testing wear quality of paper samples, a freely rotatable support for holding a sample of paper to be tested, feed wheels engageable with the opposite faces of said sample and effective to rotate said sample and said support as the result of feeding action, means for driving at least one of said feed wheels, means for stopping the rotation of said support at periodic intervals to thereby momentarily cause slip between the sample and said feed wheels, and means for automatically stopping said feed wheels upon tearing of said sample.

4. In a device for testing wear quality of paper samples, a base, a sample support mounted on said base and including a standard, a vertically disposed spindle rotatably mounted in said standard and having a support member secured to the upper end thereof, a pair of clamping discs releasably mounted on said support member and adapted to clamp a paper sample therebetween, feed wheels mounted on said base, means for driving at least one of said feed wheels, said feed wheels being engageable with the opposite faces of said clamped sample and effective to rotate said sample and said spindle as a result of feeding action, and means for stopping the rotation of said sample at timed intervals to thereby momentarily cause slip between the sample and said feed wheels.

5. In a device for testing wear quality of paper samples, a base, a sample support mounted on said base and including a standard, a vertically disposed spindle rotatably mounted in said standard and having a support member secured to the upper end thereof, a pair of clamping discs releasably mounted on said support member and adapted to clamp a paper sample therebetween, feed wheels mounted on said base, means for driving at least one of said feed wheels, said feed wheels being engageable with the opposite faces of said clamped sample and effective to rotate said sample and said spindle as a result of feeding action, means for stopping the rotation of said sample at timed intervals to thereby momentarily cause slip between the sample and said feed wheels, and means for automatically stopping said feed wheels upon tearing of said sample.

6. In a device for testing wear quality of paper samples, a base, a sample support mounted on said base and including a standard, a vertically disposed spindle rotatably mounted in said standard and having a support member secured to the upper end thereof, a pair of clamping discs releasably mounted on said support member and adapted to clamp a paper sample therebetween, feed wheels mounted on said base, means for driving at least one of said feed wheels, said feed wheels being engageable with the opposite faces of said clamped sample and effective to rotate said sample and said spindle as a result of feeding action, means for stopping the rotation of said sample at timed intervals to thereby momentarily cause slip between the sample and said feed wheels, means associated with said spindle for counting the revolutions thereof, and means for automatically stopping said feed wheels upon tearing of said sample.

7. In a device for testing wear quality of paper samples, a base, a sample support mounted on said base and including a standard, a vertically disposed spindle rotatably mounted in said standard and having a support member secured to the upper end thereof, upper and lower clamping discs releasably mounted on said support member and adapted to clamp a paper sample therebetween, feed wheels mounted on said base, means for driving at least one of said feed wheels, said feed wheels being engageable with the opposite faces of said clamped sample and effective to rotate said sample and said spindle as a result of feeding action, and means for stopping the rotation of said sample at timed intervals to thereby cause momentary slip between the sample and said feed wheels, said rotation stopping means including a lug dependably secured to said lower clamping disc and a detent having portions movable into and out of the path of travel of said lug.

8. In a device for testing wear quality of paper samples, a base, a sample support mounted on said base and including a standard, a vertically disposed spindle rotatably mounted in said standard and having a support member secured to the upper end thereof, a pair of clamping discs releasably mounted on said support member and adapted to clamp a paper sample therebetween, pairs of opposed feed wheels mounted on said base, one wheel of each pair being yieldably urged toward pressure contact with the other wheel of said pair, means for driving at least one of said wheels, said feed wheels being engageable with the opposite faces of said clamped sample and effective to rotate said sample and said spindles as a result of feeding action, means for stopping the rotation of said sample at timed intervals to thereby momentarily cause slip between the sample and said feed wheels, and means for automatically stopping said feed wheels upon tearing of said sample.

9. In a device for testing wear quality of paper samples, a base, a sample support mounted on said base and including a standard, a vertically disposed spindle rotatably mounted in said standard and having a support member secured to the upper end thereof, a pair of clamping discs releasably mounted on said support member and adapted to clamp a paper sample therebetween, pairs of opposed feed wheels mounted on said base, one wheel of each pair being yieldably urged toward pressure contact with the other wheel of said pair, means for driving at least one of said wheels, said feed wheels being engageable with the opposite faces of said clamped sample and effective to rotate said sample and said spindle as a result of feeding action, and means for stopping the rotation of said sample at timed intervals to thereby momentarily cause slip between the sample and said feed wheels.

10. In a device for testing wear quality of paper samples, a base, a sample support mounted on said base and including a standard, a vertically disposed spindle rotatably mounted in said standard and having a support member secured to the upper end thereof, a pair of clamping discs releasably mounted on said support member and adapted to clamp a paper sample therebetween, a pair of opposed feed wheels mounted on said base, means for constantly and yieldably urging one of said wheels toward pressure contact with the other, means for driving at least one of said wheels, said feed wheels being engageable with the opposite faces of said clamped sample and effective to rotate said sample and said spindle as a result of feeding action, means for stopping the rotation of said sample at timed intervals to thereby momentarily cause slip between the sample and said feed wheels, means associated with said spindle for counting the revolutions thereof, and means for automatically stopping said feed wheels upon tearing of said sample.

11. In a device for testing wear quality of paper samples, a base, a sample support mounted on said base and including a standard, a vertically disposed spindle rotatably mounted in said standard and having a support member secured to the upper end thereof, upper and lower clamping discs releasably mounted on said support member and adapted to clamp a paper sample therebetween, a pair of opposed feed wheels mounted on said base, means for constantly and yieldably urging one of said wheels toward pressure contact with the other, means for driving at least one of said wheels, said feed wheels being engageable with the opposite faces of said clamped sample and effective to rotate said sample and said spindle as a result of feeding action, and means for stopping the rotation of said sample at timed intervals to thereby cause momentary slip between the stample and said feed wheels, said rotation stopping means including a lug dependably secured to said lower clamping disc and a detent having portions movable into and out of the path of travel of said lug.

EVERETT A. MAHANNAH.